No. 774,972. PATENTED NOV. 15, 1904.
J. A. STAPLES.
VALVE AND REGULATING MEANS THEREFOR.
APPLICATION FILED JAN. 14, 1904.
NO MODEL. 4 SHEETS—SHEET 2.
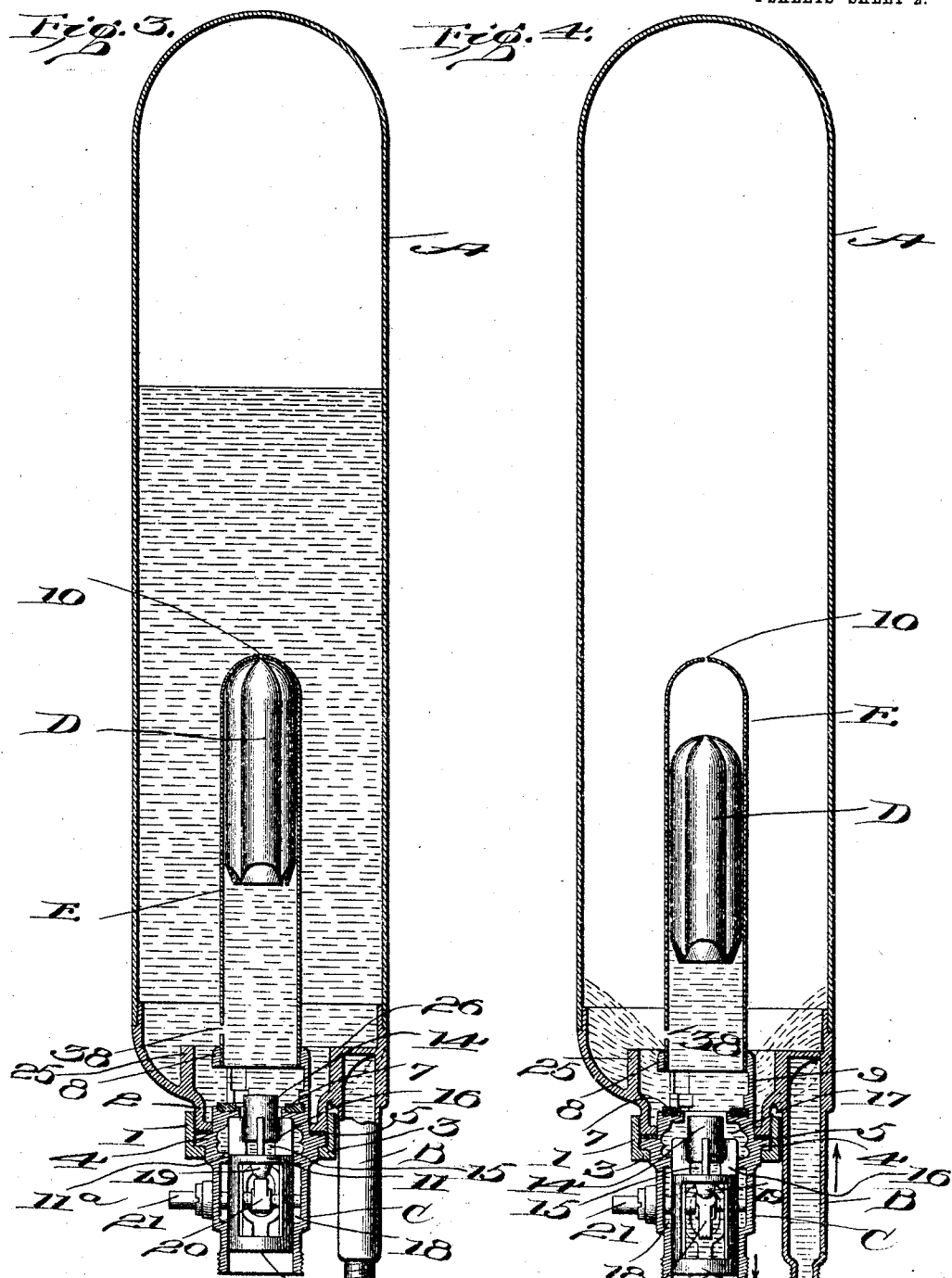

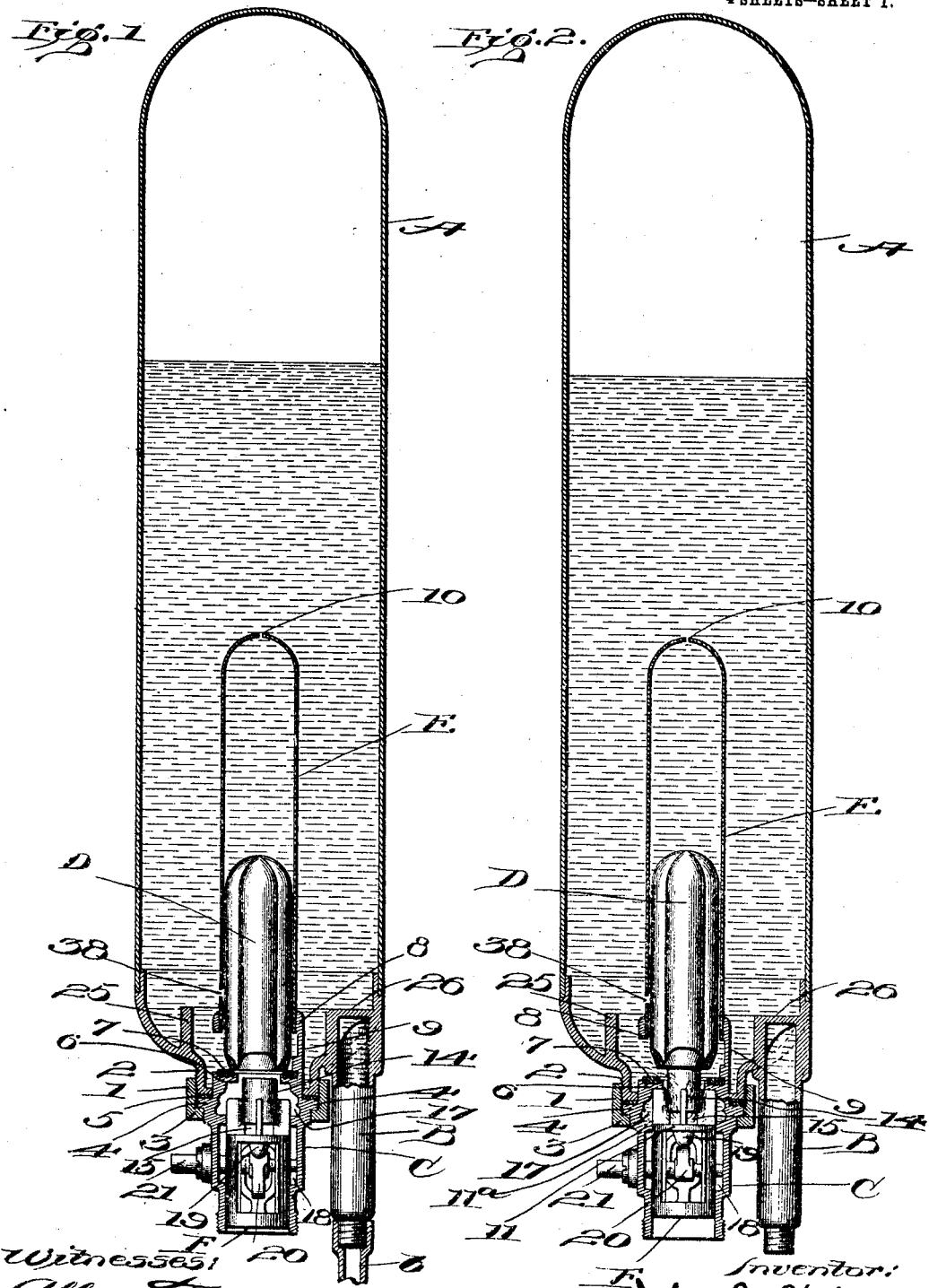

No. 774,972. PATENTED NOV. 15, 1904.
J. A. STAPLES.
VALVE AND REGULATING MEANS THEREFOR.
APPLICATION FILED JAN. 14, 1904.
NO MODEL. 4 SHEETS—SHEET 3.
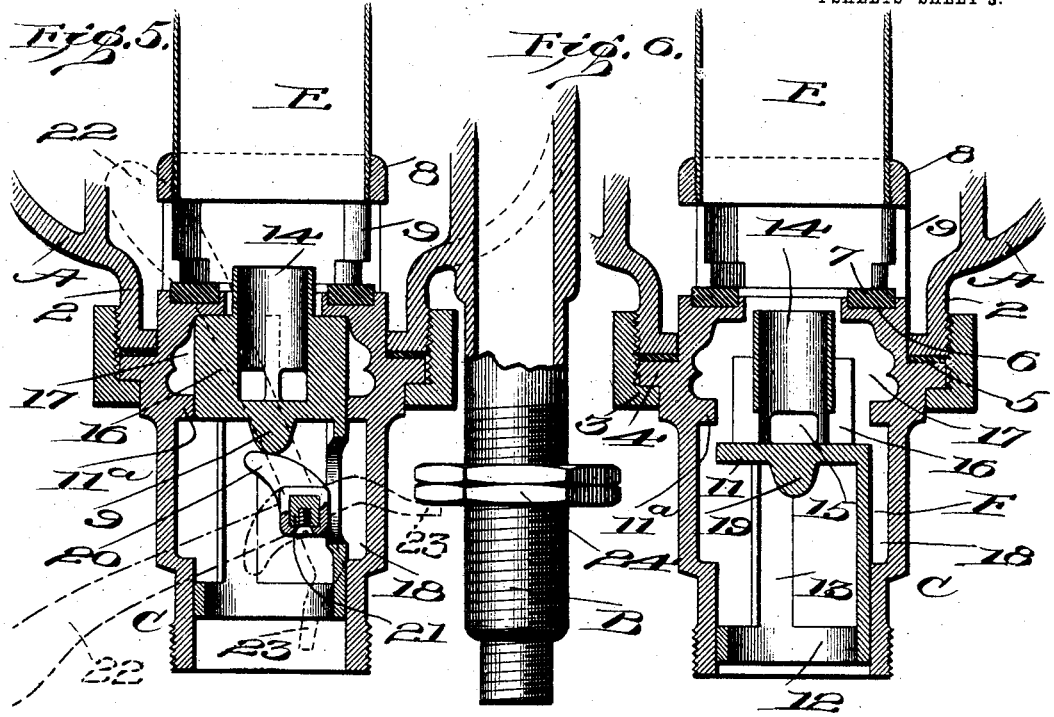
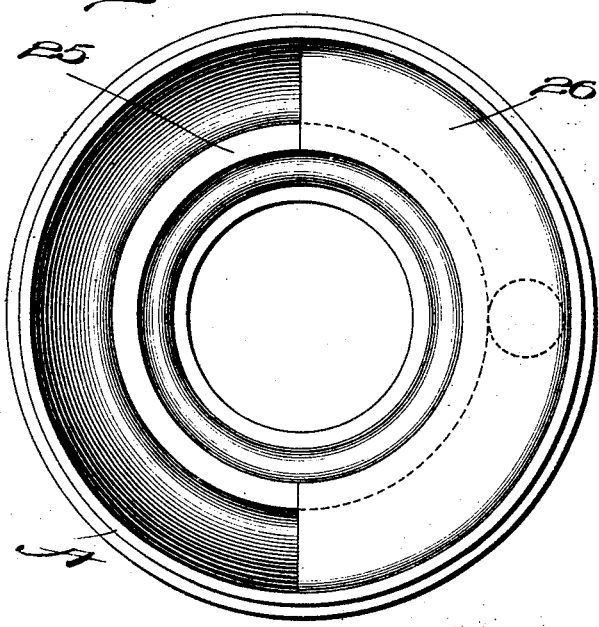
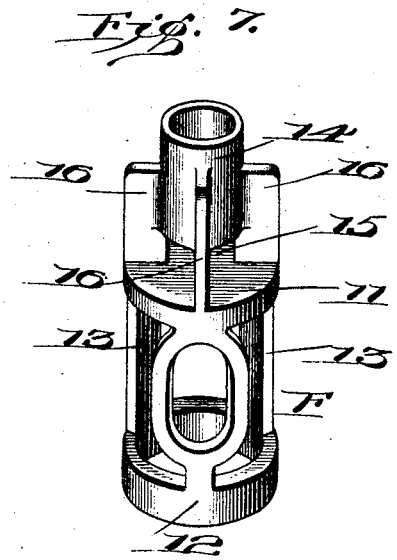
Witnesses:
Allan Groose
H. M. Seamans
Inventor:
John A. Staples
by Duell Tingrath & Warfield
Attorneys

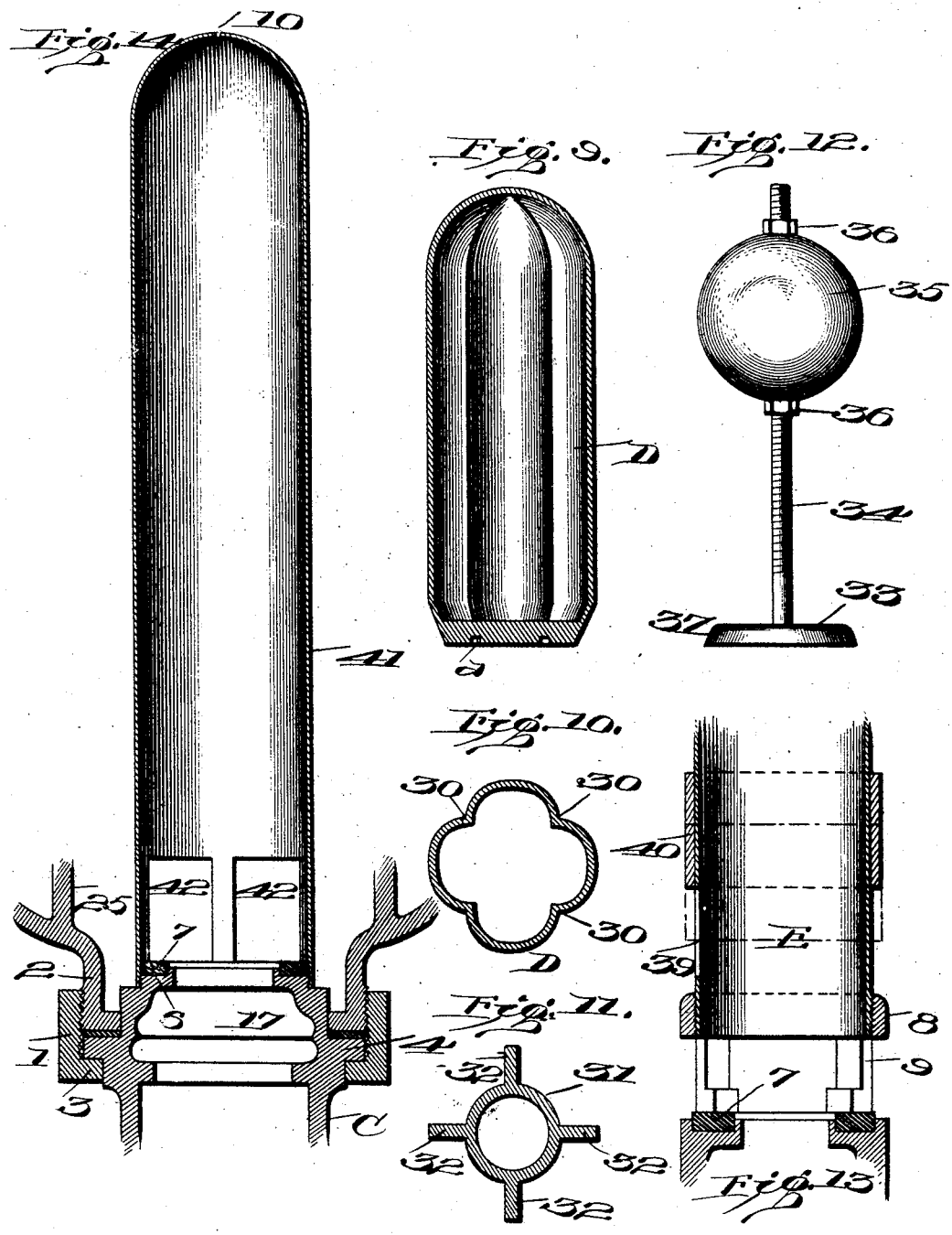

No. 774,972.

Patented November 15, 1904.

UNITED STATES PATENT OFFICE.

JOHN A. STAPLES, OF NEWBURGH, NEW YORK.

VALVE AND REGULATING MEANS THEREFOR.

SPECIFICATION forming part of Letters Patent No. 774,972, dated November 15, 1904.

Application filed January 14, 1904. Serial No. 188,953. (No model.)

*To all whom it may concern:*

Be it known that I, JOHN A. STAPLES, residing at Newburgh, in the county of Orange and State of New York, have invented certain new and useful Improvements in Valves and Regulating Means Therefor, of which the following is a full, clear, and exact description, such as will enable others skilled in the art to which it appertains to make and use the same.

This application is filed, in so far as the subject-matter and generic features of invention are the same, as a continuation of applications filed by me on October 18, 1902, for water-supply tanks, Serial Nos. 127,829, 127,830, and 127,831.

The invention relates, broadly, to valves and regulating means therefor; more specifically and in one embodiment thereof to water-supply tanks. Its object in general is to provide an improvement in a valve structure or means for controlling communication between two points and also in the actuating means therefor.

Further objects and advantages will be in part obvious from the following description and in part pointed out.

The invention is especially adapted for controlling the flow of a liquid or fluid under pressure, as in the case of intermittent discharges from water-supply tanks or service-pipes for flushing purposes; but it is capable of use in a variety of relations.

The invention consists in the features of construction, combinations of elements, arrangement of parts, and means for the utilization of principles, a specific embodiment of which is illustrated in the accompanying drawings, the general nature of which will be set forth in the following description, and the scope of the application of which will be pointed out in the claims.

The invention proposes, broadly, a valve adapted to be interposed at any point where control of communication is desired, means for opening the valve, means under the control of a confined body of air or pneumatic spring for closing the valve, means for regulating the tension of said pneumatic spring, and a novel and peculiar form of valve and coöperating elements.

Subsidiary details of invention tending to increase the efficiency of the apparatus and improve the result will be more specifically set forth hereinafter.

The invention is here illustrated in a specific embodiment thereof particularly adapted for controlling water-supply tanks furnishing intermittent water discharges for any purpose or which may be employed in any relation where limited discharges are desired, as for flushing purposes, and said embodiment will now be described, whereupon the broad principles and generic features of the invention may be understood.

In the drawings, Figure 1 is a vertical sectional view showing a water-supply or valve-operating tank with feed and delivery connections therefor and equipped with a valve and coöperating devices embodying the principles of this invention. Fig. 2 is a similar view showing the position of the parts when an initial movement has been given to the valve opening or unseating means by movement of the actuating-handle. Fig. 3 is a similar view showing a further position of the parts, the same being the next in the cycle of valve movements. Fig. 4 is a similar view illustrating a further step in the cycle and showing the parts as they appear at a point just preliminary to the final reseating of the valve, when it assumes again the position shown in Fig. 1. Fig. 5 is a sectional view, on an enlarged scale, showing the delivery connection and a plunger which operates within said connection and acts both as a subsidiary valve and as a means for giving the main delivery-valve an initial unseating movement, said plunger being in its raised and operative position. Fig. 6 is a similar view taken at a different angle and showing the plunger in its normal inoperative position. Fig. 7 is a perspective view of the plunger. Fig. 8 is a view in top plan looking down into the tank, an upper section of which has been removed, and illustrating the construction of a means for regulating the inflow of water from the feed-pipe. Figs. 9 and 10 are vertical and transverse sections, respectively, of an elongated hollow float which forms the main controlling-valve of the system shown. Fig. 11 is a transverse section illustrating a modification in the form of said float. Fig. 12 is a further modification showing a float embodying the same generic principles, but of different construction. Fig. 13 is a view showing a proposed means of adjustment for one of the coacting elements of the valve-regulating means. Fig. 14 illustrates a modification in the form of the chamber which may be located within the tank and which may constitute one of the coacting elements of the valve-regulating means, said modification embodying the same generic features as the inner chamber illustrated in the other views, but exhibiting a difference in details of construction.

Similar reference characters refer to similar parts throughout the several views.

In embodying this invention in a valve and regulating means therefor adapted to control the delivery of water from a water-supply tank or from a service-pipe for flushing purposes certain considerations become especially prominent. It is desired to utilize a body of air confined within the tank to aid or quicken the discharge of the water and also to control the reseating of the valve, said valve being preferably a buoyant element adapted when upon its seat to control communication between the tank and the delivery. Under such circumstances the control of the valve must, in order to be efficient, be rendered independent of the varying pressure from the source of supply, and if the operation of the valve is to be uniform the quantity of air within the tank which is utilized as a means for controlling the valve must be kept substantially uniform. The problem of keeping a uniform quantity of air within the tank is complicated by the fact that air is likely to be fed in with the supply from the feed-pipe in the form of foam or bubbles which have been carried along with the water when passing over a dam at the source of supply or which have become associated with the water in the feed-pipe in any other way, as by turning the water into an empty service-pipe, thereby carrying the air which is in such pipe in advance of the incoming stream. These and other conditions cause a congestion of air within the tank, thereby increasing the tension of the pneumatic controlling-spring, causing a lack of uniformity in the action thereof and eventually, if continued, rendering the tank air-bound, thereby preventing a proper supply of water from the feed-pipe and causing such a quick closing of the valve as to prevent the furnishing of the desired supply of water through the delivery. On the other hand, various causes may operate to produce a condition of air depletion within the tank, so that the confined body of air becomes too weak to operate efficiently as a means for controlling the valve and the valve-seats slowly or not at all. Such an air-depleted condition may be brought about by an imperfect form of valve, which will permit leakage of air therearound by feeding the water into the tank above the level of the water when the valve is open, thereby carrying bubbles of air with the feed down into the water and out through the delivery by a jet from the feed sufficiently forcible to destroy the water cushion which it is desired to maintain about the valve-seat, thereby exposing the delivery and permitting escape of air therethrough and in various other ways not necessary to be enumerated. The problem accordingly becomes one of maintaining a uniform air tension at all times independently of the varying pressure from the source of supply and independently of any and all causes which operate to produce a condition of air congestion or of air depletion within the tank.

Reference may be had to Figs. 1 and 5 to 8, inclusive, as illustrating the mechanical details of the embodiment which is here used to illustrate the principles of the invention.

A tank, which may be of any desired form and construction, is indicated at A, and the feed and delivery connections thereto are indicated at B and C, respectively. Certain important features of the invention require that this tank be closed so as to be practically air-tight. It will be understood that the feed connection B is to be connected to any available service-pipe, as indicated at *b*, Fig. 1, the feed connection B being preferably of enlarged diameter between the point where the service-pipe is coupled on and the tank, as shown. The delivery connection C is adapted to be coupled with any suitable delivery or flushing pipe, as by the threads shown at the lower end thereof. The upper end of the delivery connection C projects into the tank A and is held thereto in any desired way, as by the nut 1, which is internally screw-threaded to engage the exterior threads on the contracted lower portion of the tank at 2, said nut having an inwardly-extending annular flange 3, which engages beneath an outwardly-extending flange 4 on the connection C. The joint between said connection and the tank proper may be packed, if desired, by a gasket 5, inserted between the upper face of the flange 3 and the lower rim of the tank-opening. The upper face of the connection C at 6 forms a valve-seat, a packing-ring 7 being supported thereon, if desired. Upon this seat normally rests an elongated hollow float D, which forms the main operating-valve of the system shown. A ring 8 is carried within the tank by standards 9, projecting upwardly from the delivery connection C, and this ring is internally threaded for connection with the lower end of the elongated cylindrical chamber E, closed at its upper end save for the presence of a small air-port 10 and open at its lower end for the reception and movement of the elongated float.

Within the connection or coupling C is mounted for reciprocating movement a plunger F. (Shown in perspective in Fig. 7.) This plunger comprises an upper disk 11 and a lower ring 12, the two being joined by vertical ribs 13. On the upper face of the disk is carried a cup 14, open at its upper end and having side passages or waterways 15 adjacent the lower end thereof. There are also preferably provided guides in the form of webs 16, extending radially of the cup 14, which steady the movement of the plunger. These webs, with the disk 11 and ring 12, are of substantially the same diameter as the inner diameter of the delivery connection, so that the plunger has a smooth working fit therein. The inner wall of the connection C is recessed annularly at the upper end thereof, as at 17, and also at a point below, as at 18, the two recesses being separated by the flange 11$^a$, Figs. 5 and 6, which is of the normal diameter of the connection. The lower face of the disk 11 is provided with a projection or lug 19, adapted to be engaged for reciprocating the plunger by a cam 20, carried by a rock-shaft 21, suitably journaled in the sides of the connection and adapted to be rocked by any suitable handle, chain, or other actuating means.

One form of actuating means which may be used is shown in Fig. 5 as embodying a handle 22, secured to the rock-shaft 21, so as to turn therewith. It may be desired under certain circumstances to provide means for adjusting the throw of the plunger in order to adjust the rate or volume of the discharge by adjusting the extent of the opening through the delivery. Such an adjusting means is, however, shown and claimed, broadly, in an application for water-supply tanks filed by me on June 16, 1902, Serial No. 111,835, and is only claimed herein as an element of a combination not disclosed in said application. As one embodiment of such adjusting means the handle is shown projecting beyond the rock-shaft, as at 23, and this projecting part is adapted to be engaged by check-nuts 24 adjustable upon the threaded feed connection B. The full line showing of the cam 20 corresponds with the upper position of the handle, to which position it is raised when it is desired to operate the valve. After such operation the distance to which the handle will fall may be determined by adjustment of the nuts 24, thus determining the downward travel which will be permitted to the cam 20, which is followed in its downward movement by the plunger.

It will be noted that the delivery connection C is free to rotate with respect to the tank except when it is locked thereto by the nut 1. Accordingly the delivery connection may be turned to the position shown in Fig. 5, such that the projecting end of the handle 22, mounted on rock-shaft 21, may contact with the check-nuts 24 or to the position shown in Figs. 1 and 4, it having been illustrated in such position in these figures for purposes of greater clearness.

For regulating the inflow of water from the feed connection B the mouth thereof is preferably arranged to open into the lower end of the tank and behind a ring 25, arranged within the tank and surrounding the valve-seat at the lower end thereof. A section of the circular groove thus formed between the wall of the ring and the wall of the tank is closed over by a plate 26, which extends above the mouth of the feed connection B, the rest of the groove being open at the top.

The operation of the parts thus far described may now be understood. In the normal condition of the apparatus the parts are as shown in Fig. 1, and the pressure of water from the supply or feed connection has filled the tank to about the level shown, the air in the tank being compressed at the upper end thereof and the buoyant valve being held to its seat by the pressure thereon. Upon rocking the actuating-shaft so as to carry the cam thereon upward against the lug on the plunger the plunger is carried up to the position shown in Fig. 2, the disk 11 on the upper end thereof closing the opening within the flange 11$^a$, thereby acting as a supplementary valve to close the passage through the delivery connection and to trap a quantity of air in the upper recess or chamber 17 and within the cup 14. During the movement of the plunger the lower ring and the ribs by which it is connected to the disk act to steady and assure right-line movement therefor. As the plunger is carried up the cup 14 contacts with the lower face of the buoyant valve D and raises said valve slightly, giving it what may be termed an "initial unseating movement." Water from the tank above will then rush in around the lower edge of the valve, will strike the outer wall of the air-cup 14, be deflected into and around the recess 17, and will pass through the openings or waterways 15 into the cup, partially filling said cup and confining a body of air at the upper end thereof beneath the valve. As soon as the pressure on the upper and lower surfaces of the valve is equalized, the valve being buoyant will rise to the upper end of the inner chamber to the position shown in Fig. 3. The air which has been confined in the upper end of the air-cup then passes upwardly to join the air at the upper end of the tank and is added thereto. Thus at each operation of the apparatus a quantity of air is trapped by the subsidiary valve, which air is protected from the downrush of the water from the tank and fed up into the tank. This feed of air at each operation is an important feature as preventing an air-depleted condition within the tank and coöperating with further means for maintaining a uniform quantity of air therein, as will be hereinafter apparent. Passing to the next step in the cycle of valve movements, as shown in Fig. 4, the plunger is depressed to the position shown in said figure by the pressure of water thereabove as soon as the force applied to the actuating-handle is released, and there is then a passage through the delivery connection by way of the air-cup 14, the waterways 15, the recess 17 around the disk 11, into the lower recess or chamber 18, thence down and out through the ring, as best shown in Fig. 6. The water then continues to discharge until the water-level in the main tank outside the inner chamber reaches a point, as shown in Fig. 4, such that it falls to and below a port or opening 38 in the side of the inner chamber. Air will then be admitted to the inner chamber, and the buoyant valve which may have been forced slightly down from the upper end thereof by the pressure of air admitted through the small port at the upper end will be forced to its seat, the valve will be closed, and the parts returned to the position shown in Fig. 1.

In order to prevent escape of the air in the air-cup between its mouth and the lower face of the closing-valve, any suitable form of seal may be employed—as, for example, by providing an annular groove $d$, Fig. 9, in the bottom of the float of such size and shape as to receive the mouth of the air-cup.

In order that the float may be operative for its purpose and yet be steadied and guided in its movement in the inner chamber, said float is preferably provided with longitudinal recesses or waterways 30, Fig. 10, along its sides, which will permit passage of air or water from one end to the other of the float within the chamber, while at the same time the maximum diameter of the float will be sufficient as compared with the inner diameter of the chamber E to insure its smooth movement. As fulfilling the same purpose a float may be used, if desired, of various outlines, one possible form being shown in Fig. 11, wherein the body of the float is cylindrical, as at 31, and there are provided vertical radially-extending webs or fins 32 of a width sufficient to act as guides for the float in its movements in the inner chamber. Obviously, also, a communication within the chamber above and below the float could be obtained by using a cylindrical float and arranging the waterways in the walls of the inner chamber itself. A further modification of the form of the float which will still provide an elongated buoyant member is shown in Fig. 12, in which figure the float is composed of a plate or disk 33, which is adapted to rest upon the valve-seat in the delivery connection and seal said delivery, and an upwardly-extending threaded standard 34, which carries a hollow ball 35, said ball being adjustable along the standard and held at any desired point thereon by lock-nuts 36 36. The upper edge of the disk 30 is preferably beveled slightly, as at 37, in order that it may pass easily within the mouth of the inner chamber.

The point at which the inner chamber opens into the main chamber, whether at its lower end or through a side opening, as at 38, determines the point at which air will be admitted to the upper surface of the valve in sufficient quantity to force it home to its seat through the quantity of water still remaining in the tank, which remaining quantity of water forms a water cushion. The depth of this water cushion determines the quantity of air which will be held within the chamber, a certain part of the air when there is an excess being blown off through the water cushion prior to the seating of the valve. Accordingly the depth of the water-cushion and the quantity of air which will be retained in the inner chamber may be regulated by adjusting the point at which air is admitted to "explode" the inner chamber or force the valve therefrom to its seat. This may be done in many ways, a possible construction for that purpose being shown in Fig. 13, wherein the opening in the side of the inner chamber is in the form of a slot 39, the length of which may be regulated by a sleeve 40, movable up and down with relation thereto, a second position of the sleeve being shown in dotted lines. By adjusting this sleeve the point at which air is admitted to the inner chamber to explode said chamber may obviously be varied at will.

In the construction shown in the figures to which reference has thus far been made the inner chamber is supported upon standards projecting upwardly from the delivery connection C, and openings are provided which may be below the chamber between said standards or in the wall of such chamber, as shown, through which air may be forced up into the inner chamber when the water-level has dropped sufficiently low. One of many possible modified constructions for accomplishing the same purpose is shown in Fig. 14, wherein an inner chamber 41 is supported directly upon the upper face of the valve-seat, as by screwing it thereon, and the openings through which the chamber is exploded are made to coincide with the waterways by which access is gained from the tank to the delivery. In the former views these waterways are shown as between the standard 9. Here they are shown in the sides of the chamber 41, as at 42 42. These modifications are shown not as in any way covering the list of equivalents, but as merely illustrative of certain ways in which the mechanical construction of parts may be varied without departing from the scope of the invention. Many other modifications will be obvious or may be easily deduced from the principles of the invention by any mechanic conversant with this art.

The general principles and advantages of this invention and the scope of application thereof should now be apparent upon considering somewhat more fully the theory upon which the construction and operation of the embodiment shown is based. I do not intend this theory to be necessarily exhaustive, nor do I intend to be limited thereto; but I will explain my theory of the invention and some of the advantages to be derived therefrom in order that the invention as a whole may be better understood. This will be best done by grouping the functions and advantages of the various features of the invention each under its own head.

*Pneumatic power.*—This is an important feature, as I believe that I am the first who has ever suggested or disclosed means whereby a controllable or regulatable air-power may be utilized for operating a valve in the manner set forth. The advantages of using air-pressure as a positive means for seating the valve will be readily appreciated. Such air-power, however, is at the best an uncertain one under conditions in which it must be used, and it is further important that there should be provided some means for controlling its action. As one embodiment of such means I have shown and described a means for regulating the quantity of air in the tank in order to maintain a uniform tension thereof. The confined body of air within the tank constitutes, in effect, a pneumatic spring, the power of which is utilized incidentally to aid in discharging the water in the tank, but mainly for controlling the reseating of the valve. Looking at the problem from this standpoint the importance of a provision of means for maintaining a uniform tension of this spring as the means for feeding air to the tank at each operation and means for blowing off any excess of air beyond the quantity sufficient to maintain a predetermined pressure will be obvious. Clearly it is most convenient to have the normal pressure within the tank at least atmospheric pressure, and the pneumatic spring may then be considered as made up of the quantity of air which will be held by the tank under normal atmospheric conditions. If this quantity of air is placed under compression and then expanded, it will be just sufficient to empty the tank and reseat the valve if there is no obstruction in the way. As the spring expands, however, the action toward the end of its expansive limit or near the bottom of the tank will be weak and uncertain. For this reason I have found that it is advisable to keep the spring always under some compression and utilize as the final operative part thereof or the part which completes the expulsion of the water and reseats the valve a part within the limit of expansion of the spring. Graphically stated, the spring in the tank may be considered to have a length of thirty inches when fully expanded. If, however, the spring were only to complete its operation by reseating the valve at the end of a stroke of thirty inches, the operation would be very uncertain. By the use of means whereby the action of the spring is utilized to complete the expulsion of the water from the tank, so far as such expulsion is desired, and to reseat the valve before the spring has reached its limit of expansion I am able to use as the operative part of the spring a part which is under sufficient tension to render its action sharp and efficient. This may be otherwise set forth by stating that there is always a working margin left in the spring after each operation. Thus if there is a water cushion of three inches in a tank thirty inches long the valve would be seated when there was still three inches of expansion remaining to the spring and the quantity of air be maintained uniform no matter what the pressure from the source of supply might be. Thus whether the spring at the initial expansion was such that it occupied five inches or ten inches or any other part of the tank its action when it had reached the expansion of twenty-seven inches would be always the same, and accordingly the operation of the valve would be uniform and could be adjusted both as to time and so as to prevent injurious concussion between the parts.

Under many conditions in use it may be found desirable to maintain a quantity of air in the tank in excess of the quantity which will produce normal atmospheric pressure. This may be done by feeding in additional air, as described, and controlling the quantity of air up to any desired pressure. Thus if I start with a spring of thirty inches in a thirty-inch tank I may pump in free air from the outside until there is a thirty-three-inch spring confined within the thirty-inch tank. Then if there is a water cushion of three inches the operative expansion of the spring will be at the twenty-seven-inch point and there will be practically a constant six-inch compression remaining in the spring at the time when the float is seated. Obviously, however, these considerations affect the operation of the apparatus under different conditions of use without affecting the theory of the invention, and the invention may be varied as to such points within wide limits.

*Valve.*—While various forms of valves, as a ball of ordinary spherical form, could be used in place of an elongated valve such as that shown, the use of such elongated valve is preferable and desirable. The problem which I have endeavored to solve in this connection is the production of a valve which will be of such form as to form a positive seal for the vortex when it is exposed to the action of the vortex as where no inner chamber is used, the diameter of which will be of such relation to the diameter of the vortex as to offer a minimum resistance to the water in its passage therethrough in both directions which will be of sufficient power or carrying capacity, which will be steady on its seat, so as not to be disengaged therefrom except through intentional operation of the apparatus, and which while being buoyant shall still be heavy enough to be steady in both directions. The elongated valve fulfils all these conditions and, moreover, is of advantage in connection with the use of a pneumatic spring, the action of which is rendered certain and efficient by utilizing it to seat the valve before it has reached the limit of its expansion, as has already been indicated. If a ball-valve were seated by the pneumatic spring in a tank of this character, there would be proportionately, perhaps, one-half or three-quarters of an inch of expansion left in the spring when the valve was seated. This would not only render the action of the spring weak and uncertain at the time of seating the valve, but would leave so small a working margin that slight causes tending to air depletion would so weaken the spring as to render it inoperative. With an elongated valve it is possible, however, to attain the advantages of working under a greater margin, so that there may be greater fluctuation in the air-pressure or the tension of the spring without rendering the device inoperative. In other words, it is desirable to utilize the air-pressure in the tank to positively seat the float or to have the air-cushion act on the float before it loses its expansive force. The initial force or expansion of the compressed air in the tank is very great and of course continually diminishes as the air expands toward normal conditions. If the air acts upon the float to seat the latter before it expands to its normal atmospheric volume or condition, it is evident that the float seats under the pressure of compressed air, which makes it positive in its seating action. If, on the other hand, the air does not act to seat the float before it has expanded to its entire limit, the float merely sinks to its seat as the water in the tank empties or subsides, and as the last few inches of water empty more slowly, owing to the decreased air-pressure, the seating of the float is very slow and uncertain. When the float merely follows the subsidence of the water, it will not seat until practically all the water is discharged, and as the inlet-supply may frequently approximate the delivery the float will wabble around on its seat, so that the flush is prolonged beyond necessary or practical limits. If the float be positively seated through a greater or less quantity or depth of water, the length of time that the tank takes to discharge may be regulated. This can be accomplished by suitable forms of long floats, such as have been shown. When the float hangs three inches deep in the water, its seating-point will reach the seat while there is still remaining three inches of water in the tank and while the expansive force of the compressed air is operating upon it. As the depth of the float in the water increases or its point of flotation is raised it will seat through correspondingly-greater thickness of water and under correspondingly-greater air-pressure. By using such a float it may be made to hang at any desired depth in the water, and thus vary the length of time for it to seat and the discharge to continue. Therefore upon the ability of the float to take its seat through a greater or less quantity of water will depend the length of time that the tank takes in discharging, and consequently the amount of water discharged. Moreover, as the float hangs deep in the water its tendency to float off its seat when the tank is filling is not exerted until the water reaches a height of several inches in the tank, at which time the air is so compressed that its pressure upon the top of the float keeps it securely on its seat. The form of float-valve adapted to have these capabilities may of course be varied. It may be in the form of an oblong body, or it may be a ball with a dependent portion to engage the seat, as shown, or otherwise. The only requirement is that it shall be of such elongated form as to hang or depend more or less within the water of the tank instead of merely floating upon the surface. The advantage of this feature may perhaps be best understood by considering the action of a coiled spring of normal length of thirty inches placed vertically on a table or support. If this spring is compressed to any desired extent, as up to ten inches, and then released to twenty-nine and one-half inches, the upper end of the spring at such time will be weak and wabbly, and any tripping or other action to be effected thereby would be uncertain. If, however, the upper end of the spring is held when it has reached an expansion of twenty-seven inches, it will still be firm and responsive and any function to be performed thereby may be accurately predetermined. The elongated float, as already indicated, has an advantage in maintaining the water cushion in that its center of flotation is at a substantial distance above its point of seating or seating area, so that it may be seated while there is still a depth of water remaining in the tank sufficient to form a water cushion. It will be obvious that the center of flotation of the float itself may be adjusted, as in Fig. 12, or various lengths of float may be used to meet various conditions.

*Water cushion.*—Certain of various means which may be employed to form and maintain a cushion about the valve-seat have already been explained, and the advantages of this feature of invention should be clear. The water cushion has to do with the regulation of the pneumatic power and the controlling of the reseating of the valve both as to time and force. It is also desirable, as shown, that the feed from the pneumatic service-pipe or source of supply should be on the line of or below this water cushion in order to prevent air depletion and interference with the operation of the valve.

*Inner chamber.*—One of the important functions performed by the inner chamber is the shielding of the float-valve from the action of the pneumatic spring until a desired point, which may be predetermined, during the delivery of water from the tank. Thus it is possible to seat the valve after a given quantity of water has been discharged from the tank, the quantity remaining constituting a water cushion the depth of which will determine the resistance to the escape of the compressed air from the tank and accordingly the amount retained. If the water cushion is a thin one at the moment of seating and there is a condition of air congestion within the tank, a certain amount of this air will blow through this water cushion prior to the seating of the valve. If there is no air congestion or if there is air depletion, all the air in the tank will be held by the water cushion, and its quantity will be rapidly increased by the feed until the proper condition is reached. The air tension will then be held at this point by the combined action of the air-feed and the means for blowing off any excess or undesired quantity beyond that which will maintain a uniform tension on the pneumatic actuating-spring.

Referring again to Figs. 3 and 4, it will be seen that as the water falls in the main tank it reaches the level of the top of the inner chamber E, and the air-pressure is then cut off entirely from the upper surface of the water contained in said inner chamber except for the space occupied by the area of the small port 10. The air-pressure being now deflected around the inner chamber and exerted directly on the surface of the descending water causes the water in the tank to be forced rapidly downward, only a small quantity of air being admitted to the inner chamber through the port 10, the inner chamber emptying more slowly than the main tank, and the float is held in suspension in the water in the inner chamber at a higher level than the descending water in the main tank. By this means the float is protected from the force of the pneumatic spring and also from the current or vortex of the descending water and is held out of the way, so as to leave the discharge-opening unobstructed until the tank has been emptied to the desired point. As the water in the tank descends around the outer walls of the inner chamber to a level opposite the opening 38, it is evident that air will be admitted to the inner chamber as soon as this opening is unsealed. The air-pressure in the inner chamber will then be the same as it is in the rest of the tank and being exerted at the top of the float causes the float to dive quickly to its seat, the float being driven through the remaining cushion of water in the bottom of the tank by air-pressure and suction. The port 10 may be made of any desired size within such limits as will allow the escape of air from the inner chamber upon the upward movement of the valve. Unless, however, sufficient and substantial provision is made for this escape of air from the inner chamber the apparatus will be inoperative. Within such limits by varying the size of this port the air may be admitted therethrough with more or less rapidity after the water-level has fallen below the upper end of the inner chamber as the tank is discharging and the float caused to follow more or less closely the fall of water in the main tank. The excess air-pressure in the tank tends to blow through the water cushion at the bottom of the tank at the discharge-opening while the float is held in suspension above. It is obvious that it requires greater or less pneumatic power to blow through the remaining water cushion, as this cushion varies in thickness, the resisting power of a thick cushion being greater than that of a thinner cushion. By raising or lowering the point at which air is admitted to the inner chamber, as by adjusting the point of opening in the wall thereof, as by a means illustrated in Fig. 13, I may admit air to the inner chamber at any desired altitude within reasonable working limits, and thus leave a water cushion at the bottom of the tank of a thickness represented by the distance from the point at which the inner chamber is exposed to the action of the air in the outer chamber to the tank-bottom or valve-seat. For example, if the opening 38 in the inner chamber be elevated two inches above the valve-seat air will be admitted to the inner chamber at this point, and there will practically remain a water cushion of about two inches in thickness in the bottom of the tank. Briefly stated, it may be said that the inner chamber serves as a means for controlling or retarding the descent of the float-valve, thereby regulating both the time and quantity of the discharge and also regulating the quantity of air which constitutes the pneumatic spring to regulate said spring and keep it within proper working limits.

Obviously the opening in the side wall of the inner chamber may be dispensed with and the mouth of said chamber placed at any desired distance from the valve-seat. Then by regulating the size of the upper port 10 the level of the water in the inner chamber may be caused to follow more or less closely the fall of the water-level in the outer chamber. Under some conditions of pressure the lower mouth of the inner chamber may not be unsealed at all, the seating of the float being caused by the force of the air and water to which it is subjected, independently of the unsealing of its mouth, and also depending upon the length of the float under the limitations already set forth. When, however, the pressure increases beyond the desired extent, the water-level falling in the outer chamber more quickly than in the inner chamber, the excess air will be blown off and the float will then be seated after the mouth of the lower chamber has been unsealed.

As a further function performed by the inner chamber it should be noted that it serves to soften the descent of the float upon its seat and avoid concussion. Assume that the inner chamber is removed and the mechanical valve actuated to throw the float off its seat. Now if the handle be immediately dropped before the float has an opportunity to get away from its seat for any appreciable distance it is likely to be caught in the suction of the descending water and prematurely forced home to its seat.

Where an inner chamber is used, the float is sufficiently out of the way as soon as it has passed upward past the mouth of the inner chamber and is not affected by the suction of the delivery-opening. The inner chamber therefore has to do with the instantaneous unseating of the float as it eliminates the element of suction therefrom, and it has also to do with the reseating of the float and prevents its being prematurely forced home to its seat, with the resulting shock and concussion. It is accordingly important that the inner chamber, while it may be widely varied in form, should be of a shape to receive and protect the float from the action of the water in the tank, it being for this purpose provided with an air-vent to allow the escape of air therefrom in order that the float may pass up into it. There should also be provided means in accordance with which the valve may be controlled independently of the water-level in the main tank. The invention is thus differentiated from all devices wherein there is provided a guide for a float-valve which simply determines a line of movement therefor and from those devices, wherein the valve is only seated as the water-level falls to or below the mouth of the delivery connection. My apparatus provides a controllable valve which is radically different from those valves which merely drop down with the water and are seated by gravity.

*Air feed and equalization.*—As a source of air-supply for the tank it is desirable to utilize the air in the equalizing-chamber intermediate the closing-valve and the operating-valve. It is also desirable to utilize the discharge or outlet of the tank as the opening through which to introduce the equalizing-jet into the equalizing-chamber from the tank; but when the tank-outlet is used as the equalizing-opening I have found in practice that the sudden delivery of the equalizing-jet from above when the float is lifted off its seat to make the equalizing-opening forces the air downward through and out of the air-chamber instead of allowing it to rise into the tank as an available air supply or feed and that the air in the intermediate chamber does not, under these conditions, pass upward through the descending water, but is either forced through the controlling-valve, which does not remain air-tight for any length of time, or is compressed into a cushion in the lower part of the intermediate chamber and upon the controlling-valve and is swept out of the chamber by the swiftly-moving body of water when the discharge takes place. It is therefore desirable to protect at least a part of the air in the inner chamber and shield it from the action of the water in order to utilize it to prevent air depletion in the tank. One of the objects of the present invention is accordingly to provide means whereby I may equalize the pressure on the closing-valve through the discharge or outlet opening and employ at least part of the air within the equalizing-chamber as a source of supply to the tank.

As shown in the drawings, the closing-valve is lifted from its seat by means of the air-cup at the same time that the plunger closes the intermediate air-chamber and cuts off the waste or delivery passage, and the flow of water through the discharge-pipe and the consequent suction in the tank are momentarily checked, so that the breaking of the seal between the closing-valve and its seat enables a portion of the water of the tank to pass into the equalizing-chamber, which is now temporarily formed between the two valves, to build up an equalized pressure under the float to the end that it may readily and quickly unseat and ascend. When the plunger is moved to close the delivery and initially unseat the closing-valve, the temporary cutting off of the discharge and suction preserves the water in the tank in a quiet or still state, the small quantity that passes into the equalizing-chamber not being sufficient to appreciably disturb the body or mass of water, and the float is therefore free to act in still water and is uninfluenced by any disturbance of the mass in the tank. When the plunger or subsidiary controlling-valve is initially moved to break the seal of the closing-valve, the water flowing past the seat into the equalizing-chamber acts upon the surface of the closing-valve that was surrounded by the seat and such additional surface as before was in contact with the seat and now is exposed by the initial movement of the closing-valve. This additional surface is thus exposed to the pressure in the equalizing-chamber, and as the equalizing-chamber is quickly filled by the jet or film of water forced through between the closing-valve and its seat the pressure is applied on an area of the lower portion of the closing-valve approximately equal to the area on its upper surface, so that complete equalization takes place and the valve readily moves upward. It is evident that this complete equalization is obtained when the initial movement of the closing-valve is sufficient to break the seal around its seat and that this stage is practicably and workably approximated when the valve is lifted sufficiently to start a leak around its lower end. There is a gain in compactness and efficiency in this construction by providing for the feeding of the air to the tank, as by the air-cup, through the same opening by which water is admitted beneath the valve to equalize the pressure thereon. Obviously, however, these functions could be performed by independent elements or elements otherwise related.

The term "air-cup" in the specification and claims is intended to define a receptacle or element which is adapted to receive and hold a substantial quantity of air and protect said air from the entraining action of the water. While this function may be performed by a cup such as shown adapted to be normally closed at its upper end by the buoyant valve and having at its lower end waterways through which water may enter, the air-chamber being formed between these two points, a cylindrical element adapted to be closed at its upper end by a valve and having longitudinal passages or ports substantially coextensive with its length would not come within the scope of the term "air-cup" as it is intended herein, inasmuch as there would be no substantial area within such cylinder which would be protected from the entraining action of the water, and consequently no protected air-chamber.

*Prevention of bubbles.*—The dam or baffle interposed in the path of the incoming stream of water is important in that it softens the force of such stream and lessens any tendency to wash the float from its seat, thereby opening the delivery accidentally. Checking the force of the incoming jet or stream also lessens any tendency to impair the stability of the water cushion while the valve is off its seat, which might result in depleting the air-supply. Various means may obviously be utilized for carrying out this feature of the invention. As one of such means which may be used conjointly with the dam or independently thereof I have shown the diameter of the feed connection increased adjacent the point at which it empties into the tank. This also results in checking or lessening the force of the incoming stream and its tendency to interfere with the desired operation of the valve.

*Slow-closing valve.*—While I have shown the invention as embodied in a flushing-tank with feed and delivery connections therefor, it is obvious that certain features of the invention may be utilized at any point where it is desired to control communication in a conduit. The tank or operating-chamber may then be within the conduit or arranged at any desired point such that the valve may be controlled thereby. While I have throughout discussed the principle of the invention in connection with a water-tank, it is immaterial what liquid or fluid is adapted to be passed through the conduit, and the use of the terms "water," "water-inlet," and "outlet" in this relation is merely for purposes of illustration. It should be noted also that the quantity of water-supply through the outlet or delivery connection will depend to some extent upon the quantity of water delivered by the feed-supply while the valve is unseated. With proper regulation of the size of the supply and delivery, the quantity of water desired for flushing may be obtained in whole or part directly from the supply-pipe, and the tank then becomes rather an operating-chamber for the valve than a supply-tank. With a feed connection relatively small the tank acts both as an operating means and as a means for storing the water. If the size of the feed connection is properly proportioned to the delivery, the tank or valve-casing may be made just large enough to hold a sufficient quantity of water to permit the float to remain in suspension while the desired quantity of water is being passed through the delivery. The delivery may be adjusted or proportioned so that it is barely able to take care of the incoming stream without drawing from the accumulated supply, which then becomes not a source of water-supply, but a means for controlling the power and for suspending the controlling-valve. Between the two extremes any intermediate proportions may be obtained by proper adjustment of the parts. The proper proportion of the feed and delivery may be determined initially or may be determined by adjusting the opening in one or both connections. A means for adjusting the opening in the delivery at will is shown in Fig. 5, wherein the capacity of the delivery and the amount of water that can flow therethrough may be determined by determining the stroke of the plunger on its downward movement by adjusting the position of the check-nuts with which the handle, which moves with the plunger, contacts on the downward stroke of the plunger.

It will be understood that the terms used in defining this invention both in the specification and claims are used merely in a descriptive and not in a limiting sense. I believe this invention as to many features both broad and subsidiary to be a pioneer one. In view of such fact and of the fact that I have here disclosed, broadly, an apparatus which builds up its own power—as, for example, by feeding air from the outside to furnish an operative supply in case of depletion—regulates such power and controls the application thereof, I believe that I am entitled to a broad construction of the invention, both as to terms used and as to range of equivalents.

Having described my invention, what I claim as new, and desire to secure by Letters Patent, is—

1. In combination with a conduit and a valve controlling communication therethrough, means for opening said valve, means for closing said valve under pneumatic pressure, and means for regulating said pneumatic pressure in its action as a valve-closing means.

2. In combination with a conduit and a valve controlling communication therethrough, means for opening said valve, means for confining a body of air in position to control the closing of said valve, and means for regulating the quantity of the air so confined.

3. In combination, a valve means for opening said valve, a pneumatic spring for controlling the closing of said valve, and means for regulating the operative length of said pneumatic spring in its action upon the valve.

4. In combination, a valve, means for opening said valve, a pneumatic spring adapted to control the closing of said valve, and means for maintaining the uniformity of the operative tension of said pneumatic spring.

5. In combination with a conduit, means for controlling communication therethrough, a confined body of air adapted to act upon said controlling means to close the communication, and means for regulating the quantity of the confined air.

6. In combination, a conduit, a valve for controlling communication therethrough, means for opening said valve, means for confining a body of air and for utilizing said air for controlling the closing of said valve, and means for regulating the quantity of air so confined.

7. In combination, a conduit, a valve for controlling communication therethrough, means for opening said valve, means including a body of compressed air for controlling and regulating the closing of said valve, and means for maintaining a uniformity of pressure of said body of compressed air upon the valve as it closes.

8. In combination with a tank and feed and delivery connections therefor, a valve adapted to establish communication between said tank and said delivery connection, means for opening said valve, means for closing said valve by the pressure of air within the tank, and means for regulating the quantity of air within the tank.

9. In combination with a tank and feed and delivery connections therefor, means for opening communication between said tank and said delivery connection, means controlled by the air within the tank for closing said communication, and means for regulating the quantity of air within the tank.

10. In combination with a tank and feed and delivery connections therefor, a means interposed between said tank and said delivery connection for controlling the communication therebetween, means for confining a body of air under compression, means whereby said body of air may be utilized to close said communication-controlling means, and means for regulating the quantity of said body of air.

11. In combination, a tank, a normally open feed connection therefor, a delivery connection therefor, a valve controlling communication between said tank and said delivery connection, means for opening said valve, a pneumatic spring acting upon said valve to control the closing thereof, and means for regulating the operative tension of said pneumatic spring.

12. In combination, a tank, feed and delivery connections therefor, a valve controlling communication between said tank and said delivery connection, means for confining a body of air within the tank in position to act upon said valve for controlling the closing thereof, and means for regulating the quantity of the air so confined.

13. In combination, a tank, feed and delivery connections therefor, a valve-seat, a bouyant valve adapted to rest on said seat and to control communication between the tank and delivery connection, and means for maintaining a water cushion about said seat through which said valve operates.

14. In combination, a tank, feed and delivery connections therefor, a valve-seat, a buoyant valve adapted to rest thereon and control communication between the tank and the delivery connection, means for unseating said valve and means for maintaining a substantial depth of water about said seat through which said buoyant member operates.

15. In combination, a tank, feed and delivery connections therefor, a valve-seat, a buoyant valve adapted to rest thereon and to control communication between the tank and the delivery connection, means for unseating the valve, means for confining a body of air within the tank under the permanent compression and for utilizing said body of air for regulating the reseating of the valve.

16. In combination, a tank, feed and delivery connections therefor, a valve-seat, a buoyant valve adapted to rest thereon and to control communication between the tank and the delivery connection, means for unseating the valve, means for confining a body of air within the tank and for maintaining said air in a state of compression, means for utilizing said body of air for reseating the valve, and means for regulating the quantity of air so confined.

17. In combination, a tank, feed and delivery connections therefor, a valve-seat, a valve adapted to rest upon said seat and to control communication between the tank and delivery connection, means for unseating the valve, means for confining a body of air within the tank and for utilizing said body of air for reseating the valve, and means for maintaining a water cushion about the valve-seat through which the valve operates.

18. In combination, a tank, feed and delivery connections therefor, a valve-seat, a valve coöperating with said seat to control communication between the tank and delivery connection, means for confining a body of air within the tank under pressure and for utilizing said body of air for reseating the valve, means for maintaining a water cushion about the valve-seat through which the valve operates, and means for varying the depth of said water cushion.

19. The combination with a closed tank having a water feed and delivery, of a buoyant valve adapted to close the delivery, means to unseat the valve, and automatic means to predetermine the time of the reseating thereof.

20. The combination with a closed tank having a water feed and delivery, of a buoyant valve adapted to close the delivery, means to unseat the valve, and automatic means to retard the reseating of the valve.

21. The combination with a closed tank having a water feed and delivery, of a buoyant valve adapted to close the delivery, means to unseat the valve, and means to retard the reseating of the valve independently of the unseating means.

22. The combination with a closed tank having a water feed and delivery, of a buoyant valve adapted to close the delivery, means to unseat the valve, and an inner chamber to receive the valve.

23. The combination with a closed tank having a water feed and delivery, of a buoyant valve adapted to close the delivery, means to unseat the valve, and an inner chamber for the valve adapted to discharge more slowly than the tank.

24. The combination with a closed tank having a water feed and delivery, of a buoyant valve adapted to close the delivery, means to unseat the valve, and an inner chamber to receive the buoyant valve and provided with an air-port.

25. The combination with a closed tank having a water feed and delivery, of a buoyant valve adapted to close the delivery, means to unseat the valve, and an inner chamber having its mouth in alinement with the delivery and adapted to be unsealed as the water in the tank descends.

26. The combination with a closed tank having a water feed and delivery, of a buoyant valve adapted to close the delivery, means to unseat the valve, and an inner chamber to receive the valve and normally sealed by the water of the tank.

27. The combination of a closed tank having a water feed and delivery, of a buoyant valve adapted to close the delivery, means to unseat the valve, an inner chamber adapted to receive the valve, and an air-inlet port in the side wall of said inner chamber.

28. The combination of a closed tank having a water feed and delivery, of a buoyant valve adapted to close the delivery, means to unseat the valve, an inner chamber adapted to receive the valve, and an adjustable air-inlet port in the side wall of said inner chamber.

29. The combination with a closed tank having a water feed and delivery, of a buoyant valve adapted to close the delivery, means to unseat the valve, means to inject air into the tank at each flush, and means to blow off the excess air.

30. The combination with a closed tank having a water feed and delivery, of a buoyant valve adapted to close the delivery, means to unseat the valve, an air-supply chamber, and an inner chamber to receive the valve and adapted to discharge its contents more slowly than the tank.

31. The combination with a closed tank having a water feed and delivery, of a buoyant valve adapted to close the delivery, means to unseat the valve, and means to govern the reseating of the valve independently of the level of the water in the tank.

32. The combination with a closed tank having a water feed and delivery, of a buoyant valve adapted to close the delivery, means to unseat the valve, and means at the delivery to permit the excess air to blow off at the delivery at each flush.

33. The combination with a closed tank having a water feed and delivery, of a buoyant valve adapted to close the delivery, means to unseat the valve, means to inject air into the tank at each flush, and means to blow off at the delivery the excess air above a predetermined quantity.

34. The combination with a closed tank having a water feed and delivery, of a buoyant valve adapted to close the delivery, means to unseat the valve, and means independent of the water-level in the tank-body to govern the reseating of the valve.

35. The combination with a closed tank having a water feed and delivery, means to feed air to the tank, of a buoyant valve adapted to close the delivery, means to unseat the valve, and means independent of the water-level in the tank-body to hold the buoyant valve in suspension to govern the reseating of the valve, whereby excess air may blow off at the outlet.

36. The combination with a closed tank having a water feed and delivery, of a buoyant valve adapted to close the delivery, means to unseat the valve, and means independent of the level of the water in the main part of the tank to retard the reseating of the valve.

37. The combination with a closed tank having a water feed and delivery, a valve to close the delivery, means to unseat the valve, means to inject air into the tank at each flush, and means to delay the reseating of the valve and permit the excess air to blow off under or around the valve at each flush.

38. The combination with a closed tank having a water feed and delivery, a float-valve to close the delivery, means to unseat the float-valve, means to inject air into the tank at each flush, and adjustable means to delay the reseating of the float and permit the excess air to blow off under the float at each flush.

39. The combination with a closed tank having a water-feed under pressure and a delivery, a valve to close the delivery, and automatic means within the tank to retain a certain definite quantity of air at the finish of each flush independent of the water-pressure delivered through the supply.

40. The combination with a closed tank having a water feed and delivery, a float-valve adapted to close the delivery, and means within the tank to receive the float-valve and prevent it from being prematurely drawn to its seat in the vortex formed by the water discharging through the delivery.

41. The combination with a closed tank having a water feed and delivery, a float-valve adapted to close the delivery, means to unseat the float, and an inner chamber within the tank adapted to receive and sustain the float-valve at an independent level from the water in the main body of the tank.

42. The combination with a closed tank having a water-feed and a water-delivery, of a valve to control the delivery, means to maintain a supply of air to the tank during the operation of the device, and means to permit an escape from the tank of air in excess of a predetermined quantity.

43. The combination with a closed tank having a water-feed and a water-delivery, of a valve to control the delivery, means to supply air to the tank, and means to permit excess air to blow off at each flush to retain a predetermined quantity of air in the tank during the operation of the device.

44. The combination with a closed tank having a water feed and delivery, of a valve to control the delivery, means to supply air to the tank, and means at the delivery coacting with the valve to permit an escape from the tank of air in excess of a given operative quantity.

45. In combination with a tank, feed and delivery connections therefor, a valve-seat and an elongated buoyant valve coöperating therewith to control communication between the tank and the delivery, means for confining a body of air within the tank, and means for utilizing said body of air for controlling the reseating of the valve.

46. In combination with a tank, feed and delivery connections therefor, a valve-seat and a buoyant valve coöperating therewith to control communication between the tank and the delivery, means for confining a body of air within the tank under pressure, means for regulating the quantity thereof and means for utilizing the expansive power of said air for reseating the valve.

47. In combination with a tank, feed and delivery connections therefor, a valve-seat and a buoyant valve coöperating therewith to control communication between the tank and the delivery, means for confining a body of air within the tank under pressure, and means for utilizing the expansive power of said air for reseating the valve such that the valve is finally seated before the air has reached its limit of expansion.

48. In combination with a tank, feed and delivery connections therefor, a valve-seat and a buoyant valve coöperating therewith to control communication between the tank and the delivery, means for unseating said valve, and means whereby said valve may be reseated prior to the emptying of the tank.

49. In combination with a tank, feed and delivery connections therefor, a valve-seat and an elongated buoyant valve coöperating therewith to control communication between the tank and the delivery, and means to control the action of the valve, the center of flotation of the valve being so related to the seating area thereof that the valve may be closed before the tank is emptied.

50. In combination, a tank, feed and delivery connections therefor, a valve-seat and a valve coöperating therewith adapted to control communication between the tank and the delivery connection, said valve comprising a buoyant member adapted to be held to its seat by pressure within the tank, means for establishing communication between the tank and the lower side of said valve for equalizing the pressure thereon, and means for feeding air to the tank through the same opening through which said equalization is obtained.

51. In combination, a tank, feed and delivery connections therefor, a valve-seat at the upper end of said delivery connection, a valve resting upon said seat and adapted to be held thereto by pressure within the tank, means for raising the valve from its seat for equalizing the pressure on the upper and lower surfaces thereof and thereby completing the unseating of said valve, and means for feeding air to the tank through said valve-seat.

52. In combination, a tank, feed and delivery connections therefor, a buoyant valve adapted to control communication between the tank and the delivery connection, said valve being normally held in position by the pressure within the tank, means for giving said valve an initial movement from its seat against the pressure thereon, a source of air-supply, and means for feeding air therefrom to the tank through the valve-seat.

53. In combination with a tank having water feed and delivery connections, a buoyant valve adapted to control communication between the tank and the delivery connection, an equalizing-chamber within the delivery, means to permit a discharge of water from the tank below the valve to equalize the pressure on the valve, and means to protect a quantity of air within the equalizing-chamber from the entraining action of the water.

54. In combination with a tank having water feed and delivery connections, a buoyant valve adapted to control communication between the tank and the delivery connection, a controlling-valve in the delivery connection to close the same and initially move the buoyant valve, and means to protect a quantity of air within the closed portion of the delivery connection against the entraining action of the water therein.

55. In combination with a tank having water feed and delivery connections, a buoyant valve adapted to control communication between the tank and the delivery connection, a controlling-valve in the delivery to close the same, and a cup-shaped projection on the controlling-valve to initially move and form a chamber below the buoyant valve when the controlling-valve closes the pipe.

56. In combination with a tank having water feed and delivery connections, a buoyant valve adapted to control communication between the tank and the delivery connection, a controlling-valve in the delivery to close the same, a cup on the controlling-valve having waterways in its lower portion and adapted to have its mouth closed by the buoyant valve when the controlling-valve closes the pipe.

57. In combination with a tank having a water feed and delivery connections, a buoyant valve adapted to control communication between the tank and the delivery connection, a controlling-valve in the delivery to close the same, and a cup on the controlling-valve to enter the tank and raise the buoyant valve when the controlling-valve closes the pipe, said cup having waterways upon its lower portion and adapted to be closed at its mouth by the buoyant valve when it contacts therewith.

58. In combination with a tank having a water feed and delivery connections, a buoyant valve adapted to control communication between the tank and the delivery connection, a reciprocating valve comprising an upper disk adapted to close the delivery above the chamber, and a ring sliding in the pipe below the chamber, a cup on the plate and having waterways at the bottom, and means to raise the controlling-valve to move the cup against the buoyant valve to close the mouth of the cup and lift the buoyant valve from its seat.

59. In a device of the class described, in combination, a delivery connection, said connection having a recess in the inner walls thereof, and a plunger adapted to close said delivery below said recess.

60. In a device of the class described, in combination, a delivery connection, said connection having a recess in the inner walls thereof, and a plunger adapted to close said delivery above said recess.

61. In a device of the class described, in combination, a delivery connection, said connection having a recess in the inner walls thereof, and a disk adapted in one position thereof to close said connection and to have a range of movement within said delivery whereby it may be alternately brought into registry and out of registry with said recess.

62. In a device of the class described, in combination, a delivery connection, said connection having upper and lower recesses in the inner walls thereof, and a plunger adapted to close said delivery between said recesses.

63. In a device of the class described, in combination, a delivery connection, said connection having upper and lower recesses in the inner walls thereof, a plunger adapted to close said delivery between said recesses, means for reciprocating said plunger, and means for determining the stroke of said plunger.

64. In a device of the class described, in combination, a delivery connection, said connection having upper and lower recesses in the inner walls thereof, a plunger adapted to close said delivery between said recesses, and at different positions thereof to determine the capacity of said delivery, means for reciprocating said plunger within the delivery, and means for determining the stroke of said plunger.

65. In a device of the class described, in combination, a delivery connection, said connection having upper and lower recesses in the inner walls thereof, a plunger adapted to close said delivery between said recesses, means for reciprocating said plunger within the delivery, and adjustable means for determining the stroke of said plunger.

66. In a device of the class described, in combination, a delivery connection, a plunger adapted to be reciprocated therein and having a part adapted in one position thereof to close the opening through said delivery, and an air-cup carried by said plunger having an opening or openings in the lower end thereof.

67. In a device of the class described, in combination, a delivery connection, a plunger adapted to be reciprocated therein and having a part adapted in one position thereof to close the opening through said delivery, an air-cup carried by said plunger having an opening or openings in the lower end thereof, and means coöperating with the inner walls of the delivery for guiding said plunger in its movement therein.

68. In combination, a tank, a feed connection therefor, a delivery connection therefor, supports carried by said delivery connection and projecting within the tank, an inner chamber carried by said supports within the tank, said supports being provided with openings therethrough to permit the passage of water from the tank to the delivery beneath said inner chamber.

69. In combination with a tank, a feed connection therefor, said connection being of increased diameter at the point where it opens into the tank, a delivery connection for said tank, and a buoyant valve adapted to close said delivery connection at a point adjacent the mouth of said feed connection.

70. In combination, a tank, a delivery connection therefor, a valve-seat and a valve coöperating therewith adapted to control communication between the tank and the delivery, means for maintaining a water cushion about the valve-seat, and a feed connection for the tank arranged to discharge within said water cushion.

71. In combination, a tank, feed and delivery connections therefor, a valve-seat and valve coöperating to control communication between the tank and delivery, and a dam interposed between the mouth of the feed and the valve-seat.

72. In combination, a tank, feed and delivery connections therefor, a valve-seat and valve coöperating to control communication between the tank and delivery, and a circular dam interposed between the mouth of the feed and the valve-seat.

73. In combination, a tank, feed and delivery connections therefor, a valve-seat and valve coöperating to control communication between the tank and delivery, a circular dam interposed between the mouth of the feed and the valve-seat, and a plate extending between the top of said dam and the walls of the tank and closing over a section of the groove formed therebetween.

74. In a valve-regulating means, in combination, an operating-tank, automatic means for supplying air thereto, means for retaining a predetermined quantity of air within the tank, and means for compressing said air and for utilizing its expansive power for operating the valve.

75. In combination, a tank, feed and delivery connections therefor, a valve-seat and a buoyant valve coöperating to control communication between the tank and the delivery, means for building up a pneumatic spring within the tank, and a controllable means for utilizing the expansive power of said spring for operating the valve.

76. In combination with a conduit and a buoyant valve controlling communication therethrough, means for opening said valve, means for closing said valve under pneumatic pressure, and means for regulating said pneumatic pressure in its action as a valve-closing means.

77. In combination, a conduit, a buoyant valve for controlling communication therethrough, means for opening said valve, means for confining a body of air and for utilizing said air for controlling the closing of said valve, and means for regulating the quantity of air so confined.

78. In combination, a conduit, a buoyant valve for controlling communication therethrough, means for opening said valve, means including a body of compressed air for controlling and regulating the closing of said valve, and means for maintaining a uniform tension of said body of compressed air upon the valve as it closes.

79. In combination with a closed tank and feed and delivery connections therefor, a buoyant valve adapted to establish communication between said tank and said delivery connection, means for opening said valve, means for closing said valve by pressure of air within the tank, and means for regulating the quantity of air within the tank.

80. In combination, a tank, feed and delivery connections therefor, a buoyant valve controlling communication between said tank and said delivery connection, means for opening said valve, a pneumatic spring acting upon said valve to control the closing thereof, and means for regulating the operative tension of said pneumatic spring.

81. In combination, a tank, feed and delivery connections therefor, a buoyant valve controlling communication between said tank and said delivery connection, means for confining a body of air within the tank in position to act upon said valve for controlling the closing thereof, and means for regulating the quantity of the air so confined.

82. In combination, a tank, feed and delivery connections therefor, a valve-seat, a buoyant valve adapted to rest upon said seat and to control communication between the tank and delivery connection, means for unseating the valve, means for confining a body of air within the tank and for utilizing said body of air for reseating the valve, and means for maintaining a water cushion about the valve-seat through which the valve operates.

83. In combination, a tank, feed and delivery connections therefor, a valve-seat, a buoyant valve coöperating with said seat to control communication between the tank and delivery connection, means for confining a body of air within the tank under pressure and for utilizing said body of air for reseating the valve, means for maintaining a water cushion about the valve-seat through which the valve operates, and means for varying the depth of said water cushion.

84. The combination with a closed tank having a water feed and delivery, a buoyant valve to close the delivery, means to unseat the valve, means to inject air into the tank at each flush, and means to delay the reseating of the valve and permit the excess air to blow off under or around the valve at each flush.

85. The combination with a closed tank having a water-feed under pressure and a delivery, a buoyant valve to close the delivery, and automatic means within the tank to retain a certain definite quantity of air at the finish of each flush independent of the water-pressure delivered through the supply.

86. The combination with a closed tank having a water feed and a delivery, of a buoyant valve to control the delivery, means to maintain a supply of air to the tank during the operation of the device, and means to permit an escape from the tank of air in excess of a predetermined quantity.

87. The combination with a closed tank having a water-feed and a water-delivery, of a buoyant valve to control the delivery, means to supply air to the tank, and means to permit excess of air to blow off at each flush to retain a predetermined quantity of air in the tank during the operation of the device.

88. In combination with a closed tank having a water feed and delivery, a buoyant valve to control the delivery, means to supply air to the tank, and means at the delivery coacting with the valve to permit an escape from the tank of air in excess of a given operative quantity.

89. In combination, a tank, a delivery connection therefor, a valve-seat and a buoyant valve coöperating therewith adapted to control communication between the tank and the delivery, means for maintaining a water cushion about the valve-seat, and a feed connection for the tank arranged to discharge within said water cushion.

90. In combination, a closed tank, feed and delivery connections therefor, a valve adapted to control the delivery connection, a pneumatic spring adapted to control the closing of said valve, and means for maintaining uniformity of the pressure of said pneumatic spring as the valve closes.

91. In combination, a closed tank, feed and delivery connections therefor, a buoyant valve adapted to control the delivery connection, a pneumatic spring adapted to control the closing of said valve, and means for maintaining uniformity of the pressure of said pneumatic spring as the valve closes.

92. In combination, a tank, feed and delivery connections therefor, a valve-seat and a valve coöperating therewith to control communication between the tank and the delivery connection, means for unseating the valve, means for confining a body of air within the tank under compression, and means for utilizing the expansive power of said body of air for reseating the valve before it has reached the limit of its expansion.

93. In combination, a tank, feed and delivery connections therefor, a valve-seat and a buoyant valve coöperating therewith to control communication between the tank and the delivery connection, means for unseating the valve, means for confining a body of air within the tank under compression, and means for utilizing the expansive power of said body of air for reseating the valve before it has reached the limit of its expansion.

94. In combination, a tank, feed and delivery connections therefor, a valve adapted to control communication between the tank and the delivery connection, means to unseat the valve, a pneumatic spring, means for maintaining the operative tension of said pneumatic spring, and means for utilizing said pneumatic spring to control the closing of said valve before it has reached its limit of expansion.

95. In combination, a tank, feed and delivery connections therefor, a buoyant valve adapted to control communication between the tank and the delivery connection, means to unseat the valve, a pneumatic spring, means for maintaining the operative tension of said pneumatic spring, and means for utilizing said pneumatic spring to control the closing of said valve before it has reached its limit of expansion.

96. In a device of the class described, in combination, a tank, feed and delivery connections therefor, a valve adapted to control communication between the tank and the delivery connection, means for confining a body of air within the tank in position to control the closing of said valve, means for replenishing said air in case of depletion, and means for depleting said air in case of congestion beyond the desired operative limits.

97. In a device of the class described, in combination, a tank, feed and delivery connections therefor, a buoyant valve adapted to control communication between the tank and the delivery connection, means for confining a body of air within the tank in position to control the closing of said valve, means for replenishing said air in case of depletion and means for depleting said air in case of congestion beyond the desired operative limits.

98. In a device of the class described, in combination, a closed tank, feed and delivery connections therefor, a valve adapted to control communication between the tank and the delivery connection, an inner chamber adapted to receive the valve, said inner chamber being provided with an air-vent adapted to admit air therethrough gradually from the tank.

99. In a device of the class described, in combination, a closed tank, feed and delivery connections therefor, a buoyant valve adapted to control communication between the tank and the delivery connection, an inner chamber adapted to receive the valve, said inner chamber being provided with an air-vent adapted to admit air therethrough gradually from the tank.

100. In a device of the class described, in combination, a closed tank, feed and delivery connections therefor, a valve therein adapted to control communication between the tank and the delivery connection, an inner chamber within the tank having an open mouth at its lower end adapted to receive the valve, and an air-port in said inner chamber at a point above the level of its mouth and adapted to allow a gradual passage of air between the tank and the inner chamber.

101. In a device of the class described, in combination, a closed tank, feed and delivery connections therefor, a valve adapted to control communication between the tank and the delivery connection, a chamber within said tank having a mouth at its lower end above and in position to receive said valve, and an air-port at the upper end thereof adapted to permit the gradual passage of air from the tank to the inner chamber.

102. In a device of the class described, in combination, a closed tank, feed and delivery connections therefor, a buoyant valve adapted to control communication between the tank and the delivery connection, a chamber within said tank having a mouth at its lower end above and in position to receive said valve, and an air-port at the upper end thereof adapted to permit the gradual passage of air from the tank to the inner chamber.

103. In a device of the class described, in combination, a closed tank, feed and delivery connections therefor, a valve adapted to control communication between the tank and the delivery connection, an inner chamber within said tank adapted to operate in the control of said valve when off its seat, and an opening in said inner chamber located above the mouth thereof through which air may be gradually admitted from the interior of the tank.

104. In a device of the class described, in combination, a closed tank, feed and delivery connections therefor, a valve adapted to control communication between the tank and delivery connection, an inner chamber within the tank having an open mouth at its lower end above the valve and in position to receive the valve when it is unseated, and means whereby a predetermined quantity of air may be gradually admitted to the inner chamber while the valve is off its seat and within said chamber.

105. In a device of the class described, in combination, a closed tank, feed and delivery connections therefor, a valve adapted to control communication between the tank and the delivery connection, means to unseat the valve, an inner chamber above the valve open at its lower end to receive the valve after it has been unseated, and a communication between said chamber and the tank above the mouth thereof whereby during the emptying of the tank a definite quantity of air may be admitted to the inner chamber in order to reseat the valve after a predetermined interval.

106. In a device of the class described, in combination, a closed tank, feed and delivery connections therefor, a valve adapted to control communication between the tank and the delivery connection, means to unseat the valve, an inner chamber above the valve open at its lower end to receive the valve after it has been unseated, and an air-port at the upper end of said chamber whereby during the emptying of the tank a definite quantity of air may be admitted to the inner chamber in order to reseat the valve after a predetermined interval.

107. In a device of the class described, in combination, a closed tank, feed and delivery connections therefor, a valve adapted to control communication between the tank and the delivery connection, a confined body of air within the tank, and means for differentiating the action of said confined body of air between the main body of water in the tank and the valve.

108. In a device of the class described, in combination, a closed tank, feed and delivery connections therefor, a buoyant valve adapted to control communication between the tank and the delivery connection, a confined body of air within the tank, and means for differentiating the action of said confined body of air between the main body of water in the tank and the valve.

109. In a device of the class described, in combination, a closed tank, a float-valve controlling the discharge therefrom, an inner chamber within which said float-valve operates and a restricted communicating means above the mouth of said inner chamber, said communicating means acting to admit a predetermined quantity of air to said inner chamber while the tank is emptying.

110. In a device of the class described, in combination, a closed tank, feed and delivery connections therefor, a valve adapted to close the delivery, a confined body of air within the tank, said air being placed under compression while the tank is filling, means to unseat the valve and to permit the tank to empty, and means to protect the valve in part from the force of the compressed body of air while said tank is emptying.

111. In a device of the class described, in combination, a closed tank, feed and delivery connections therefor, a buoyant valve to close the delivery, a confined body of air within the tank, said air being placed under compression while the tank is filling, means to unseat the valve and to permit the tank to empty, and means to protect the valve in part from the force of the compressed body of air while said tank is emptying.

112. In a device of the class described, in combination, a closed tank, feed and delivery connections therefor, a valve to close the delivery, a confined body of air within the tank, said air being placed under compression while the tank is filling, means to unseat the valve and to permit the tank to empty, and means to permit the air-power to be exerted on the valve gradually so that it may be seated without shock and after a predetermined interval.

113. In a device of the class described, in combination, a closed tank, feed and delivery connections therefor, a buoyant valve to close the delivery, a confined body of air within the tank, said air being placed under compression while the tank is filling, means to unseat the valve and to permit the tank to empty, and means to permit the air-power to be exerted on the valve gradually so that it may be seated without shock and after a predetermined interval.

114. In a device of the class described, in combination, a closed tank, feed and delivery connections therefor, a valve adapted to control communication between the tank and the delivery connection, means to unseat the valve, means for confining a body of air within the tank under pressure and for utilizing the expansive power of said air to reseat the valve, and means within the tank for distributing the application of said power as between the liquid within the tank and the valve.

115. In a device of the class described, in combination, a closed tank, feed and delivery connections therefor, a buoyant valve adapted to control communication between the tank and the delivery connection, means to unseat the valve, means for confining a body of air within the tank under pressure for utilizing the expansive power of said air to reseat the valve, and means within the tank for distributing the application of said power as between the liquid within the tank and the valve.

116. In a device of the class described, in combination, a closed tank, feed and delivery connections therefor, a valve adapted to control communication between the tank and the delivery connection, means to unseat the valve, a pneumatic spring adapted to be retained within said tank under compression such that it is always within the limit of its expansion, and means for utilizing the expansive power of said spring for reseating the valve.

117. In a device of the class described, in combination, a closed tank, feed and delivery connections therefor, a buoyant valve adapted to control communication between the tank and the delivery connection, means to unseat the valve, a pneumatic spring adapted to be retained within said tank under compression such that it is always within the limit of its expansion, and means for utilizing the expansive power of said spring for reseating the valve.

118. In a device of the class described, in combination, a closed tank, feed and delivery connections therefor, a valve adapted to control communication between the tank and the delivery connection, means to open the valve, means for confining a body of air within the tank under a pressure constantly greater than the normal atmospheric pressure, means for utilizing the expansive power of said air to control the closing of said valve, means for periodically adding to the supply of air, and means for permitting the escape of air in excess of a predetermined quantity.

119. In combination, a tank, feed and delivery connections therefor, a valve adapted to control communication between the tank and the delivery, means for unseating the valve, means for confining a body of air within the tank to control the reseating of the valve, and means for differentiating the action of said air as between the main body of water in the tank and the valve.

120. In combination, a tank, feed and delivery connections therefor, a buoyant valve adapted to control communication between the tank and the delivery, means for unseating the valve, means for confining a body of air within the tank to control the reseating of the valve, and means for differentiating the action of said air as between the main body of water in the tank and the valve.

121. In combination, a tank, feed and delivery connections therefor, a valve adapted to control communication between the tank and the delivery, means for unseating the valve, means for confining a body of air within the tank to control the reseating of the valve, and means for holding the valve to a line of movement central of the tank and for differentiating the action of the air-pressure as between the main body of water in the tank and the valve.

122. In combination, a tank, feed and delivery connections therefor, a buoyant valve adapted to control communication between the tank and the delivery, means for unseating the valve, means for confining a body of air within the tank to control the reseating of the valve, and means for holding the valve to a line of movement central of the tank and for differentiating the action of the air-pressure as between the main body of water in the tank and the valve.

123. In combination, a tank, feed and delivery connections therefor, a valve adapted to control communication between the tank and the delivery, means for unseating the valve, means for confining a body of air within the tank to control the reseating of the valve, means for operating the valve in a body of water communicating with the main body of water in the tank but distinguished therefrom, and means for differentiating the air-pressure as between said bodies of water.

124. In combination, a tank, feed and delivery connections therefor, a buoyant valve adapted to control communication between the tank and the delivery, means for unseating the valve, means for confining a body of air within the tank to control the reseating of the valve, means for operating the valve in a body of water communicating with the main body of water in the tank but distinguished therefrom, and means for differentiating the air-pressure as between said bodies of water.

125. In combination with a tank having water feed and delivery connections, a buoyant valve adapted to control communication between the tank and the delivery connection, a controlling-valve in the delivery connection adapted to close the same and initially move the buoyant valve, an air-cup carried by said controlling-valve and adapted to contact with the buoyant valve to raise said valve from its seat, and means for sealing the upper end of said cup by contact of the valve therewith.

126. In combination with a tank having water feed and delivery connections, a buoyant valve adapted to control communication between the tank and the delivery connection, a controlling-valve in the delivery connection adapted to close the same and initially move the buoyant valve, an air-cup carried by said controlling-valve and adapted to contact with the buoyant valve to raise said valve from its seat, and a groove in the lower face of said valve with which said cup engages to seal said cup.

127. In combination, a closed tank, feed and delivery connections therefor, a valve controlling communication between said tank and said delivery connection, means for confining a body of air within the tank in position to control the closing of said valve, and automatic means for preventing the depletion or congestion of said body of air.

128. In combination, a closed tank, feed and delivery connections therefor, a buoyant valve controlling communication between said tank and said delivery connection, means for confining a body of air within the tank in position to control the closing of said valve, and automatic means for preventing the depletion or congestion of said body of air.

129. In combination with a tank having a water feed and delivery, a valve adapted to close the delivery, means to unseat the valve, means including a confined body of air for closing said valve, and means for regulating the quantity of air so confined, said means becoming operative as the valve closes.

130. In combination with a tank having a water feed and delivery, a buoyant valve adapted to close the delivery, means to unseat the valve, means including a confined body of air for closing said valve, and means for regulating the quantity of air so confined, said means becoming operative as the valve closes.

131. In combination with a tank having a water feed and delivery, a valve adapted to close the delivery, means to unseat the valve, means including a confined body of air for closing said valve, and automatic means for regulating the quantity of air so confined, said means becoming operative as the valve closes.

132. In combination with a tank having a water feed and delivery, a buoyant valve adapted to close the delivery, means to unseat the valve, means including a confined body of air for closing said valve, and automatic means for regulating the quantity of air so confined, said means becoming operative as the valve closes.

133. In combination, a tank, feed and delivery connections therefor, a valve-seat, a buoyant valve adapted to rest upon said seat and to control communication between the tank and the delivery connection, means for unseating said valve, and means for reseating said valve independently of the water-level within the tank and prior to the emptying of said tank.

134. In combination, a tank, feed and delivery connections therefor, said feed connection being of increased diameter at the point where it opens into the tank, means for controlling communication between said tank and said delivery connection, and means for maintaining a water cushion about the mouth of said feed connection.

135. In combination, a tank, feed and delivery connections therefor, a buoyant valve controlling communication between said tank and said delivery connection, a seat therefor adjacent the mouth of said feed connection, and means for maintaining a water cushion about the mouth of said feed connection.

In testimony whereof I affix my signature in the presence of two witnesses.

JOHN A. STAPLES.

Witnesses:
J. B. KNOX,
H. S. DUELL.